3,393,132
DISTILLATION OF HYDROCARBON CHLORIDES CONTAINING PREDOMINANTLY TRICHLOROETHYLENE AND PERCHLOROETHYLENE PRODUCED BY OXYCHLORINATION REACTIONS
Raymond M. Vancamp, New Martinsville, W. Va., and William L. Deppe, Wilmington, Del., assignors to Pittsburgh Plate Glass Company, Pittsburgh, Pa., a corporation of Pennsylvania
Filed Dec. 13, 1965, Ser. No. 513,403
7 Claims. (Cl. 203—82)

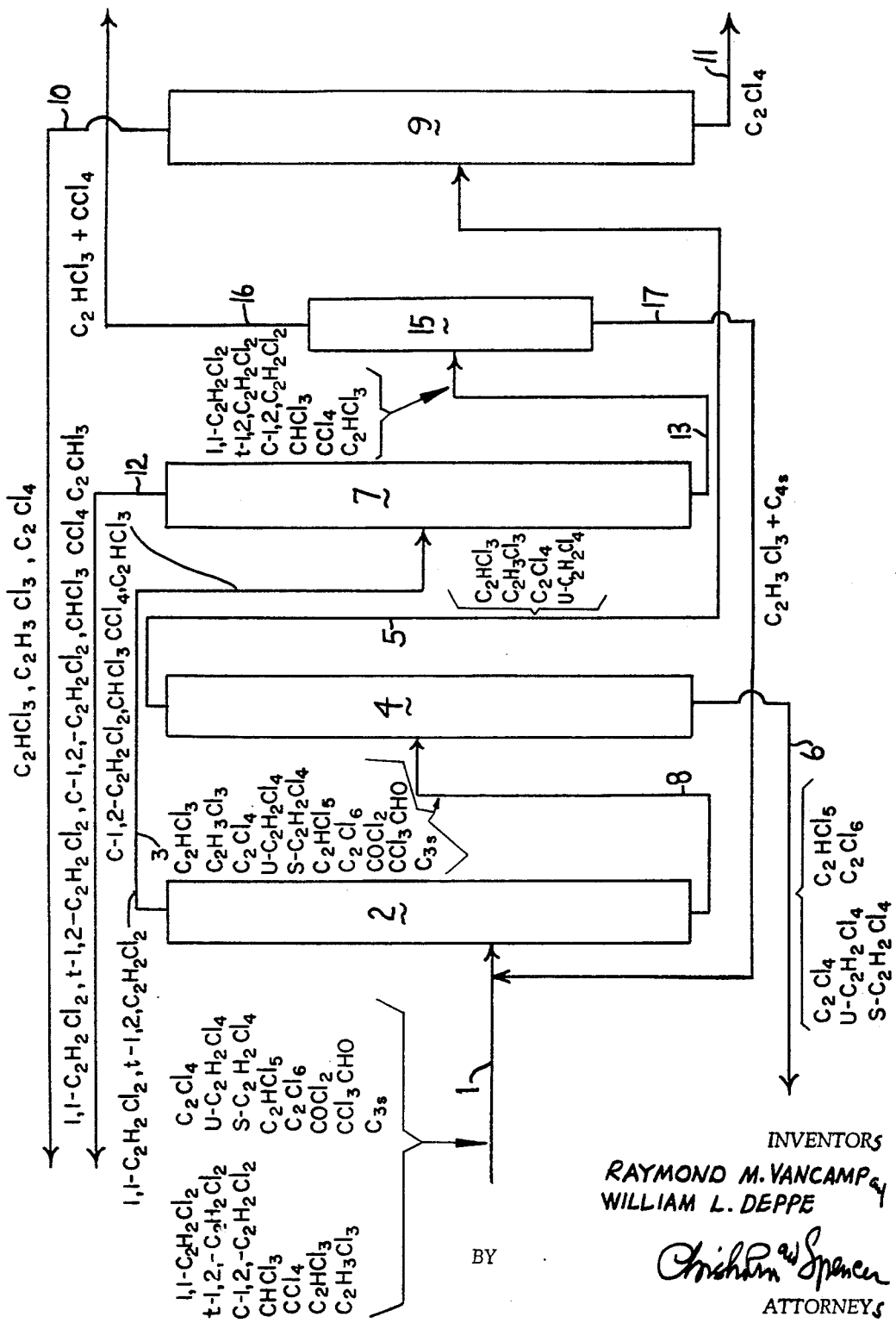

ABSTRACT OF THE DISCLOSURE

A distillation process for recovering perchloroethylene and trichloroethylene from a mixed hydrocarbon chloride crude produced by oxychlorination procedures is described. In the process, the crude is dried to a 25 to 50 parts per million water content and fed to a first still in which trichloroethylene is recovered as overhead. The bottoms of the first still contains perchloroethylene and other high boiling hydrocarbon chlorides. The trichloroethylene overhead is fed to a second still where the low boiling components are removed overhead and trichloroethylene is recovered as bottoms. The bottoms of this still is fed to a further still for recovery of pure trichloroethylene as overhead. The perchloroethylene bottoms of the first still are fed to a further distillation zone in which perchloroethylene is recovered as overhead and materials boiling higher than perchloroethylene are recovered as bottoms. The perchloroethylene overhead of this zone is fed to a final distillation zone from which it is removed as a bottoms product stream essentially pure. The overhead and bottoms temperatures of the five distillation zones are described.

---

The present invention relates to the recovery of hydrocarbon chlorides produced by catalytic vapor phase oxychlorination processes. More particularly, the present invention relates to the recovery of perchloroethylene and trichloroethylene produced by the oxychlorination of aliphatic hydrocarbons containing two carbon atoms and their incompletely chlorinated derivatives.

In recent years considerable interest in the development of oxychlorination process has occurred. Thus, processes have been developed for the production of various hydrocarbon chlorides utilizing both hydrocarbons and hydrocarbon chlorides as feed material. Typical of oxychlorination processes developed recently are those described in U.S. Patents 2,746,844, 2,783,286, 2,952,714 and 2,957,924. In the British Patent 904,084 a process is described in which perchloroethylene and trichloroethylene are produced by recourse to oxychlorination. The advent of this latter patent has provided the art with a new route to these two valuable commercial solvents.

Because of the nature of the reactions involved in producing perchloroethylene and trichloroethylene by oxychlorination, gas streams containing these materials issuing from oxychlorination reaction zones are found to be considerably different than those encountered in other commercial processes producing these solvents as vapors. Thus, processes such as those described in U.S. Patents 2,442,323 and 2,442,324 produce gas streams containing perchloroethylene which have a composition considerably different than the composition obtained when perchloroethylene is produced by oxychlorination techniques such as are set forth in the aforementioned British Patent.

Because of the complexity of the gas streams produced in an oxychlorination reaction operated under the conditions to produce perchloroethylene and trichloroethylene product, recourse to conventional processing of these two materials such as previously practiced commercially is not feasible. The content of these streams renders the recovery of pure product perchloroethylene and trichloroethylene extremely difficult and product loss by conventional distillation techniques a serious problem. In addition, pure product cannot be obtained by these conventional procedures without incurring extraordinary expense.

In accordance with the instant invention a method of recovering high purity perchloroethylene and trichloroethylene from gas streams containing these products produced by oxychlorination techniques has been provided. The method constituting the instant invention minimizes the loss of all materials found in these perchloroethylene - trichloro - ethylene oxychlorination reaction streams while at the same time providing a high purity perchloroethylene and high purity trichloroethylene. These and other advantages to be obtained by practicing the instant invention will become apparent during the discussion of this novel process.

Typically, a gas stream from an oxychlorination vapor phase reaction of a $C_2$ hydrocarbon and/or hydrocarbon chloride operated under conditions such as to produce trichloroethylene and perchloroethylene as major products is found to contain in addition to the two desired major products, quantities of saturated and unsaturated $C_2$ hydrocarbon chlorides, some $C_3$ hydrocarbon chlorides, $C_1$ hydrocarbon chlorides, HCl and water. These gases are subjected to condensation and phase separation to provide an organic crude and a water phase. The organic crude is then dried until it contains typically from 25 to 50 parts per million water, usually less than 40 parts per million. Drying may be accomplished by recourse to conventional drying techniques.

The instant invention involves the implementation of a specific sequence of distillation steps in order to recover perchloroethylene and trichloroethylene pure products from an oxychlorination gas steam poduced by the vapor phase oxychlorination of a $C_2$ hydrocarbon or $C_2$ hydrocarbon chloride and from which the water has been removed and an organic crude has been prepared for processing and distillation.

Turning to the drawing there is shown a still line suitable for handling the processing of an oxychlorination reaction stream containing predominant quantities of trichloroethylene and perchloroethylene and from which substantial quantities of water have already been removed. Thus, the organic crude material fed to the distillation train shown in the drawing contains less than 40 parts per million water therein.

As shown in the drawing dried organic crude is fed via line 1 to still 2. In still 2 conditions are maintained to provide an overhead containing predominant quantities of trichloroethylene. This trichloroethylene predominant overhead is removed via line 3 and is forwarded to still 7. The organic bottoms products from still 2 containing predominant quantities of perchloroethylene is removed via line 8 and is admitted to still 4. Still 4 is operated under conditions of pressure and temperature such that an organic containing perchloroethylene and all materials boiling below perchloroethylene, which overhead is removed via line 5 and is forwarded to still 9. The bottoms product from the still 4 is removed via line 6 and sent to storage for further treatment. The material entering still 9 via line 5 is distilled to provide an overhead product containing materials boiling below the boiling point of perchloroethylene and they are removed via line 10 where they are returned to the oxychlorination reaction zone (not shown). The bottoms product in still 9 contains essentially pure perchloroethylene which is removed via line 11 and is sent to product storage. The trichloroethylene overhead product removed from still 2 via line 3 and introduced into still 7 is distilled in still 7 to provide an overhead containing all materials boiling at boiling ponts below the boiling point of trichloroethylene which are removed via line 12. Trichloroethylene product is removed via line 13 as a bottoms product from still 7. The bottoms product from still 7 is then admitted to still 15 where it is subjected to distillation to provide a trichloroethylene overhead product which is removed via line 16 and is sent to product storage. The bottoms product from still 15 is removed via line 17 and is recirculated as part of the feed to still 2 by combining the products removed as bottoms with those being fed from the reactor via line 1, prior to their admission to the column 2.

Operating in the above described manner and by recourse to several specific sequential distillations in which the desired trichloroethylene and perchloroethylene are removed from various stills as first overhead and later a bottoms product in the case of perchloroethylene, and a bottoms product and later as an overhead product in the case of trichloroethylene, substantial savings of various materials fed to the distillation system itself are realized and useful products are removed through the system for utilization either in the basic reaction zone or for the recovery of products therefrom which can be utilized as feed to the reaction system which is producing the perchloroethylene and trichloroethylene products by oxychlorination.

In order that the invention may be more fully understood reference is made to the accompanying drawing and the following example which describes the operation of this still line in a typical run where the product stream of an oxychlorination reactor utilizing 1,2-dichloroethane as a feed material, chlorine and oxygen produced trichloroethylene and perchloroethylene as major products.

EXAMPLE I

The organic product was condensed and phase separated, dried and fed via line 1 to the still 2. A typical analysis of the stream entering the still 2 is contained in Table I.

Table I

| Component: | Amount in pounds |
|---|---|
| $1,1-C_2H_2Cl_2$ | 0.83 |
| $t-1,2-C_2H_2Cl_2$ | 5.31 |
| $C-1,2-C_2H_2Cl_2$ | 8.48 |
| $CHCl_3$ | 0.54 |
| $CCl_4$ | 4.63 |
| $C_2HCl_3$ | 114.98 |
| $C_2H_3Cl_3$ | 2.32 |
| $C_2Cl_4$ | 138.14 |
| $U-C_2H_2Cl_4$ | 1.78 |
| $S-C_2H_2Cl_4$ | 9.74 |
| $C_2HCl_5$ | 10.58 |
| $C_2Cl_6$ | 0.94 |
| $COCl_2$ | 0.03 |
| $CCl_3CHO$ | 0.12 |
| $C_3$'s | 1.58 |

Still 2 was operated at a bottoms temperature of 273° F. and a top temperature of 185° F. at a feed rate of about 275 pounds per hour. Under these conditions an overhead product of a predominantly trichloroethylene composition was produced. The composition of this organic overhead removed via line 3 and forwarded to still 7 is contained below in Table II.

Table II

| Component: | Amount in pounds |
|---|---|
| $1,1-C_2H_2Cl_2$ | 0.75 |
| $t-1,2-C_2H_2Cl_2$ | 5.90 |
| $C-1,2-C_2H_2Cl_2$ | 9.52 |
| $CHCl_3$ | 0.49 |
| $CCl_4$ | 4.39 |
| $C_2HCl_3$ | 115.33 |

Bottoms product from still 2 was removed via line 8 and forwarded to still 4. This organic stream or bottoms product from still 2 had an analysis typical of that shown in Table III.

Table III

| Component: | Amount in pounds |
|---|---|
| $C_2HCl_3$ | 0.55 |
| $C_2H_3Cl_3$ | 2.25 |
| $C_2Cl_4$ | 137.08 |
| $U-C_2H_2Cl_4$ | 1.68 |
| $S-C_2H_2Cl_4$ | 9.89 |
| $C_2HCl_5$ | 10.68 |
| $C_2Cl_6$ | 1.06 |
| $COCl_2$ | 0.02 |
| $CCl_3CHO$ | 0.06 |
| $C_3$'s | 1.86 |

This product shown in Table III was forwarded to still 4 which was operated under temperature and pressure conditions such that a percholoroethylene predominant overhead was produced. Thus, still 4 operated with a top temperature of approximately 245° F. and a bottoms temperature of about 314° F. The overhead stream removed via line 5 and forwarded to still 9 had a composition typified by that shown in Table IV.

Table IV

| Component: | Amount in pounds |
|---|---|
| $C_2HCl_3$ | 1.01 |
| $C_2H_3Cl_3$ | 2.17 |
| $C_2Cl_4$ | 124.64 |
| $U-C_2H_2Cl_4$ | 0.06 |

The bottoms product removed from still 4 and exiting via line 6 had a typical composition such as that shown in Table V.

Table V

| Component: | Amount in pounds |
|---|---|
| $C_2Cl_4$ | 15.38 |
| $U-C_2H_2Cl_4$ | 1.14 |
| $S-C_2H_2Cl_4$ | 9.73 |
| $C_2HCl_5$ | 11.26 |
| $C_2Cl_6$ | 1.11 |

The overhead stream of Table IV which was fed to still 9 was then distilled in that distillation column at a bottoms temperature at about 275° F. and a top temperature of about 213° F. Material removed from the top of the column contained 0.95 pound per hour trichloroethylene; 0.07 pound per hour, 1,1,2-trichloroethane and 3.56 pounds per hour perchloroethylene. This material exited via line 10 which recycled to the reaction zone producing the trichloroethylene-perchloroethylene vapor stream entering line 1. The bottoms product from still 9 contained approximately 118.84 pounds per hour perchloroethylene and 0.07 pound per hour unsymmetrical tetrachloroethane.

The material removed from still 2 in line 3 and shown typically in Table II was fed to still 7. This still was operated at pressures and temperatures to provide a trichloroethylene bottoms product and a light overhead. Thus, column 7 operated at a bottoms temperature of 210° F. and an overhead temperature of about 155° F. The overhead product from still 7 was removed via line 12 and recycled to an tank for use as feed to the oxychlorination reactor employed to produce the trichloroethylene-perchloroethylene gas stream entering the still line via line 1 and column 2. This stream in line 12 had a typical analysis such as is shown in Table VI.

Table VI

| Component: | Amount in pounds |
|---|---|
| $1,1-C_2H_2Cl_2$ | 0.58 |
| $t-1,2-C_2H_2Cl_2$ | 5.13 |
| $C-1,2-C_2H_2Cl_2$ | 8.94 |
| $CHCl_3$ | 0.01 |
| $CCl_4$ | 3.99 |
| $C_2CHl_3$ | 4.45 |

The material leaving still 7 via line 13 had a composition typified by the composition shown in Table VII.

Table VII

| Component: | Amount in pounds |
|---|---|
| $1,1\text{-}C_2H_2Cl_2$ | 0.17 |
| $t\text{-}1,2\text{-}C_2H_2Cl_2$ | 0.77 |
| $C\text{-}1,2\text{-}C_2H_2Cl_2$ | 0.58 |
| $CHCl_3$ | 0.38 |
| $CCl_4$ | 0.40 |
| $C_2HCl_3$ | 110.88 |

The material from line 13 was then treated in still 15 for the removal of an essentially pure trichloroethylene overhead and a bottoms product containing materials boiling above the boiling point of trichloroethylene. Thus column 15 operated with a top temperature of about 189° F. and a bottoms temperature of about 210° F. The trichloroethylene stream removed from the overhead line 16 of column 15 had a typical composition of 107.29 pounds per hour trichloroethylene and 0.06 pound per hour of carbon tetrachloride. The bottoms product from still 15 removed in line 17 had a typical composition of 3.93 pounds per hour of trichloroethylene and 0.7 pound of an unidentified $C_4$ hydrocarbon chloride.

Typical of the systems which the invention is readily applicable are those involving the oxychlorination of $C_2$ aliphatic hydrocarbons and $C_2$ aliphatic hydrocarbon chlorides. These oxychlorination reactions are typified by such feed materials as ethane, ethylene, 1,2-dichloroethane, 1,1-dichloroethane and the like. In a typical reaction the organic material for example, 1,2-dichloroethane is fed to an oxychlorination catalytic reaction zone where it is reacted with oxygen either as elemental oxygen or as air and a chlorinating agent selected from the group consisting of HCl, $Cl_2$ and mixtures of HCl and $Cl_2$. Reaction temperatures are maintained in the range of between 600 and 1100° F., preferably between 750 and 900° F. Reaction between the various feeds takes place and a trichloroethylene-perchloroethylene predominant vapor stream is removed from the reaction zone along the water produced by the oxidation of HCl as well as various other $C_1$, $C_2$ and $C_3$ hydrocarbon chlorides. While 1,2-dichloroethane is a suitable feed it is of course equally feasible to utilize material such as ethylene, ethane, 1,1-dichloroehane, 1,1,2-trichloroethane and other similar $C_2$ hydrocarbon chlorides and hydrocarbons. These materials under the elevated oxychlorination temperatures herein before set forth and in the presence of a suitable catalyst will react with HCl or chlorine in the presence of substantial quantities of oxygen to produce the desired perchloroethylene and trichloroethylene product.

Despite the complexity of the components of the gas stream produced by a reaction of this type as typified herein before by the chemical analysis of the gas stream shown in Table I, it is now possible by virtue of the present sequence of distillation steps to achieve high product purity trichloroethylene and perchloroethylene with relative ease, while recovering the many minor products produced in an efficient manner so that they can be reused.

Typical of a catalyst employed for conducting the oxychlorination reactions producing the trichloroethylene-perchloroethylene product streams of the present invention are multivalent metal halide catalysts preferably metal chloride catalysts such as copper chloride, alone or in admixture with alkali metal chlorides and other promoters. Typical of the catalysts employed are those described in U.S. Patents 2,952,714, 2,746,844 and 2,783,286.

Typical of the oxychlorination reactions which may be utilized to produce the perchloroethylene-trichloroethylene product streams of the instant invention are those described in the aforementioned British Patent 904,084. In addition to this reaction system it is of course equally feasible to employ this technology in the oxychlorination of ethane and a typical example of a patent describing such a system is French Patent 1,341,711.

The reactions contemplated for the production of these streams may be fixed bed reactions or fluid bed reactions or a combination of several oxychlorination reactions designed to produce an ultimate trichloroethylene-perchloroethylene product. The important consideration in applying the instant invention is to apply the distillation techniques to perchloroethylene and trichloroethylene containing gas streams which have been produced by oxychlorination reactions since these reaction systems produce the complex hydrocarbon chloride streams typified by those shown in Table I above.

While in the preferred mode of operation set forth in the example the trichloroethylene is removed as an overhead product from still 15, occasionly during the operation of the train shown in the drawing, trichloroethylene of sufficient purity will be recovered as bottoms from still 7. When analysis of this still bottoms product shows a trichloroethylene of sufficient purity it will of course be readily understood that the operation of still 15 may be discontinued.

The operations herein described have been described with reference to operations conducted under atmospheric conditions of pressures (760 mm. of mercury). Obviously, the stills may utilize superatmospheric conditions of pressure or may even operate under vacuum. In either of these cases corresponding changes in temperature will be made as will be readily appreciated by the skilled art.

While the invention has been described with reference to certain specific examples and illustrative embodiments it is of course to be understood that the invention is not to be thereby limited except insofar as appears in the accompanying claims.

We claim:

1. In the distillation of hydrocarbon chloride streams containing predominant quantities of trichloroethylene, perchloroethylene and minor amounts of unsaturated, chlorinated $C_2$ hydrocarbons, saturated, chlorinated $C_2$ hydrocarbons, chlorinated $C_1$ hydrocarbons, and $C_3$ chlorinated hydrocarbons, the improvement comprising feeding said stream to a first distillation zone, operated said first column under conditions of temperature and pressure so that an overhead product containing predominant quantities of trichloroethylene and materials boiling below the boiling point of trichloroethylene is produced and bottoms product containing material boiling at or above the boiling point of perchloroethylene is produced, introducing said overhead product to a second distillation zone, operating said second zone at a temperature and pressure sufficient to produce an overhead containing organic chlorides boiling below the boiling point of trichloroethylene and removing a bottoms product containing predominant quantities of trichloroethylene, feeding said bottoms product from said second zone to a third distillation zone, operating said third zone at temperatures and pressures sufficient to provide essentially pure trichloroethylene overhead and a bottoms product containing materials boiling at or above the boiling point of trichloroethylene and recovering the overhead from said third zone as product, feeding the bottoms product from said first distillation zone to a fourth distillation zone, operating said fourth zone at temperatures and pressures such that an overhead product is produced containing predominant quantities of perchloroethylene and materials boiling below the boiling point of perchloroethylene and a bottoms product containing materials boiling above the boiling point of perchloroethylene, introducing said overhead product from said fourth distillation zone to a fifth distillation zone, operating said fifth zone at temperatures and conditions such that an overhead product is removed containing material boiling below the boiling point of perchloroethylene and removing as bottoms product from said fifth distillation zone an essentially pure perchloroethylene.

2. The method of claim 1 wherein trichloroethylene is recovered as product from the bottoms of said second distillation zone.

3. The method of claim 1 wherein the distillation zones are operated under atmospheric pressure and at about the following temperatures

| | °F. |
|---|---|
| Said first zone: | |
| Overhead | 185 |
| Bottoms | 273 |
| Said second zone: | |
| Overhead | 155 |
| Bottoms | 210 |
| Said third zone: | |
| Overhead | 189 |
| Bottoms | 210 |
| Said fourth zone: | |
| Overhead | 245 |
| Bottoms | 314 |
| Said fifth zone: | |
| Overhead | 213 |
| Bottoms | 275 |

4. The method of claim 1 wherein the feed to said first zone consists essentially of a mixture of 1,1-dichloroethylene, trans-1,2 - dichloroethylene, cis - 1,2 - dichloroethylene, chloroform, carbon tetrachloride, trichloroethylene, perchloroethylene, trichloroethane, unsymmetrical and symmetrical tetrachloroethane, pentachloroethane, hexachloroethane, chloral, carbonyl chloride and $C_3$ hydrocarbon chlorides.

5. The method of claim 1 wherein the feed to said first zone contains less than 40 parts per million by weight water.

6. The method of claim 5 wherein said feed contains less than 40 parts per million by weight water.

7. The method of claim 1 wherein the bottoms from said third distillation zone is used as part of the feed to said first distillation zone.

References Cited

UNITED STATES PATENTS

| | | | |
|---|---|---|---|
| 2,888,494 | 5/1959 | Kissling | 260—654 |
| 3,065,279 | 11/1962 | Bohl et al. | 260—654 |
| 3,278,398 | 10/1966 | Statman | 203—37 |
| 3,287,235 | 11/1966 | Finneran et al. | 260—654 |
| 3,304,337 | 1/1967 | Jordan et al. | 260—654 |

FOREIGN PATENTS 821,996    10/1959    Great Britain.

OTHER REFERENCES

Robinson and Gilliland: Elements of Fractional Distillation (Chem. Eng. Series, New York, 1950), pp. 101–102 relied upon.

WILBUR L. BASCOMB, JR., *Primary Examiner.*